United States Patent [19]
Shonk et al.

[11] 3,802,903
[45] Apr. 9, 1974

[54] SOLID UREA HAVING A DEODORIZING COATING

[75] Inventors: Robert Dean Shonk, Pittsburg; Malcolm Smith Wade, Baxter Springs; Glenn Edwin Tolle, Pittsburg, all of Kans.

[73] Assignee: Willchemo, Inc., Tulsa, Okla.

[22] Filed: Oct. 16, 1972

[21] Appl. No.: 297,821

Related U.S. Application Data

[63] Continuation of Ser. No. 53,974, July 10, 1970, abandoned.

[52] U.S. Cl................ 117/16, 71/28, 71/64 E, 71/64 F, 99/2 ND, 117/100 A
[51] Int. Cl................ A23k 1/00, C05c 9/00
[58] Field of Search............ 117/100 A, 100 B, 109, 117/16; 71/64 E, 64 F, 28; 99/2 ND

[56] References Cited
UNITED STATES PATENTS

| | | | |
|---|---|---|---|
| 2,155,499 | 4/1939 | Lawson | 71/64 X |
| 2,903,349 | 9/1959 | Bryant | 71/64 X |
| 3,362,847 | 1/1968 | Day | 117/100 |
| 3,192,031 | 6/1935 | Zaayenga | 117/100 X |
| 3,202,501 | 8/1965 | Pettersson et al. | 71/64 X |
| 3,313,613 | 4/1967 | Green | 117/100 X |
| 3,392,007 | 7/1968 | Christoffel et al. | 117/100 X |
| 2,307,253 | 1/1943 | Yee et al. | 117/16 |
| 2,788,297 | 4/1957 | Louis | 117/109 |
| 3,317,307 | 5/1967 | Wise et al. | 117/109 |

*Primary Examiner*—William D. Martin
*Assistant Examiner*—Dennis C. Konopacki
*Attorney, Agent, or Firm*—Richards, Harris & Medlock

[57] ABSTRACT

The ammonia odor of synthetic urea is eliminated by grinding together citric acid and an inert solid such as clay to yield a free-flowing powder and thoroughly mixing this powder with particulate urea to form a coating on the urea particles containing from about 0.015 to 0.20 weight percent citric acid, based on the weight of urea. The reaction of citric acid with molten urea and the poor grinding properties of citric acid are alleviated by the disclosed technique.

1 Claim, No Drawings

SOLID UREA HAVING A DEODORIZING COATING

This is a continuation of application Ser. No. 53,974, filed July 10, 1970, now abandoned.

DESCRIPTION OF THE INVENTION

In recent years combinations of carbohydrates with synthetic urea have been used extensively as partial replacements for protein in feeds for ruminants. Synthetic urea as normally manufactured contains substantial and variable quantities of free ammonia. Unfortunately cattle detect the odor of ammonia in the urea and reject the feed as unpalatable. Various methods of flavoring and masking the ammonia odor have been tried so as to improve palatability but without complete success.

A completely odorless feed-grade urea has been desired for some time. The most obvious approach to the problem is to neutralize all of the free ammonia with an acid, so as to form a palatable ammonium salt. However, incorporation of an acid in the urea prior to particularization leads to reaction of urea with the acid, without the elimination of free ammonia. In fact, the actual effect is to increase the odor of ammonia in the finished animal feed as a result of thermal decomposition of urea salts during feed preparation.

According to the present invention a palatable solid acid is positioned physically close but apparently not in substantial chemical contact with the urea particles. The free ammonia becomes neutralized by the solid acid, the urea is kept substantially free of unstable urea salts and the resulting product is odorless and non-caking.

Briefly, the method of accomplishing this result comprises the following steps;

a. grinding and mixing together citric acid and sufficient inert solid material to product a free-flowing powder, and b. mixing a sufficient quantity of the free-flowing powder with particulate solid urea until the powder becomes substantially uniformly distributed in the form of a coating on the urea particles.

Step (a) is necessary because of the poor grinding properties of citric acid which tends to cohere and become sticky as it absorbs the energy necessary to yield fine particles. A variety of inert solids may be used to facilitate the formation of a free-flowing powder. However, clay is effective and is preferred for reasons of economy. For small experimental quantities in which economy is not important, chalk, diatomaceous earth, colloidal silica, powdered alumina or other inert solids may be used. If desired, other non-reactive ingredients such as pigments may be included in the coating for product identification or other purposes.

In step (b) the urea particles are coated by mixing with the powder in a suitable apparatus such as a revolving drum. The method used is essentially the same as the conventional technique for coating urea particles with clay to alleviate caking in storage. It is desirable to use sufficient clay so as to alleviate both the caking and odor problems in a single step.

The following description illustrates the method.

A mixture of equal parts of clay and citric acid was ground in a micro pulverizer to yield a free-flowing powder which was used in various proportions to coat small prilled urea particles (designated commercially as "micro-prills") which were substantially spherical and had the following particle size distribution:

| | |
|---|---|
| less than 14 mesh (U.S. Series) | 99.9% |
| greater than 18 mesh | 2.1% |
| greater than 20 mesh | 10.4% |
| less than 20 mesh | 89.6% |
| greater than 60 mesh | 97.1% |
| less than 100 mesh | 0.3% |

Coating was accomplished by mixing in a rolling bed in a rotating drum in the conventional manner employed for clay coating. Coatings were made at citric acid contents of from 0.013 weight percent to 0.1 weight percent based on the weight of urea. At the lowest level of citric acid content the coating failed to eliminate ammonia odor from some samples. A practical lower limit of 0.015 weight percent citric acid was found to be sufficient to eliminate ammonia odor from samples of prilled urea having the lowest level of free ammonia. About 0.2 weight percent citric acid was found to be sufficient to eliminate odor even from prilled urea having free ammonia contents greater than 175 ppm. There appeared to be no substantial benefit obtained from use of a larger proportion of citric acid. Normal product having from about 60 to 110 ppm free ammonia was effectively deodorized by a coating containing 0.05 weight percent citric acid. Several tons of micro prilled urea coated with a mixture of clay and 0.05 weight percent citric acid were shipped by barge during warm weather. After shipment and storage for several days the product was free from odor and indicated zero free ammonia by titration. In the use of this urea product in the formulation of feed pellets, no ammonia odor develops and there is no indication of unpalatability when the pellets are fed to cattle.

We claim:

1. Solid, substantially spherical particles of urea bearing on their surfaces a coating comprising a finely divided inert solid and from about 0.015 to 0.20 weight percent citric acid, based on the weight of urea.

* * * * *